INVENTOR
B. H. HAMILTON
BY
G. F. Heuerman
ATTORNEY

# United States Patent Office 2,759,142
Patented Aug. 14, 1956

2,759,142

TRANSISTOR AND ELECTROMAGNETIC CONTROL APPARATUS

Billy H. Hamilton, Orange, N. J., assignor to Bell Telephone Laboratories, Incorporated, New York, N. Y., a corporation of New York Application April 7, 1953, Serial No. 347,344

15 Claims. (Cl. 323—66)

This invention relates to control apparatus and particularly to transistor controlled electromagnetic apparatus for controlling the current supplied from a current source to a load to regulate the load voltage and current.

An object of the invention is to provide an improved control circuit for electromagnetic apparatus.

Another object is to provide improved apparatus for regulating the voltage across a load to which direct-current is supplied from a current source.

Another object is to provide a transistor circuit for controlling electromagnetic apparatus substantially independently of transistor characteristic changes due to ambient temperature variations.

This invention is an improvement over the invention disclosed and claimed in an application of F. H. Chase, Serial No. 341,519, filed March 10, 1953.

In a specific embodiment of the invention, herein shown and described for the purpose of illustration, there are provided magnetic amplifiers each of which comprises a saturable reactor and a rectifier, the rectifier of the final magnetic amplifier supplying direct current to a load circuit including a load which may vary. The saturable reactor of each magnetic amplifier comprises a core of magnetic material having a plurality of windings thereon including at least one impedance winding or power winding through which current is supplied from an alternating-current supply source to the rectifier of the magnetic amplifier. Each saturable reactor also has at least one saturating winding or control winding on the core to which direct current is supplied for controlling the impedance of the impedance winding. Current is supplied to the saturating winding of the reactor of the final amplifier from the rectifier of a preceding magnetic amplifier which may be the first magnetic amplifier when only two magnetic amplifiers are provided. In some cases, moreover, a single magnetic amplifier may be used.

For maintaining the load voltage substantially constant over a load current range below a certain maximum amplitude, the reactor of the first magnetic amplifier is provided with a first and a second saturating winding and there is provided a transistor circuit comprising two transistors for controlling the supply of currents from the final rectifier to these saturating windings respectively. These currents are caused to flow through the saturating windings, respectively in directions to cause opposing magnetomotive forces to be set up in the core. The transistor control circuit is connected to the load circuit so that an increase of load voltage will cause the current supplied to one of these saturating windings to increase and the current supplied to the other of these saturating windings to substantially simultaneously decrease, and vice versa. The two saturating windings preferably have equal turns and the bias current in a third saturating winding may be adjusted so that, for a predetermined load voltage, the currents in the first and second saturating windings, respectively, will be equal. For this condition, the resultant of the direct magnetomotive forces set up by the first and second saturating windings, respectively, will be zero. The current supplied from the alternating-current supply source through the impedance winding to the rectifier of the first magnetic amplifier is also a unidirectional current so that the impedance winding also sets up a direct magnetomotive force in the core. When the load voltage increases or decreases with respect to the predetermined value, the magnetomotive force due to one of the first and second saturating windings will increase and the magnetomotive force due to the other of the first and second saturating windings will simultaneously decrease. The resultant of these two magnetomotive forces will thus increase in one direction in responce to an increase of load voltage and in the other direction in response to a decrease of load voltage, each with respect to the predetermined load voltage. When this resultant magnetomotive force opposes the magnetomotive force due to the impedance winding, the increase of the resulant magnetomotive force causes the impedance of the impedance winding to increase and when the resultant magnetomotive force aids the magnetomotive force due to the impedance winding, the increase of the resultant magnetomotive force will cause the impedance of the impedance winding to decrease. By thus providing two saturating windings which are simultaneously energized from the transistor control circuit, a larger change of impedance of the impedance winding is produced in response to a change of load voltage than would be the case if a current change of the same magnitude were utilized to control a single saturating winding. Moreover, the operating characteristics of a transistor change in response to an ambient temperature change. If, as a result of an ambient temperature change of the transistors, the currents supplied to the saturating windings should increase, for example, the increase of the magnetomotive force due to one of the first and second saturating windings would oppose the increase of magnetomotive force due to the other of the first and second saturating windings so that substantially no change would take place in the resultant of the two magnetomotive forces, thereby substantially eliminating the effect of ambient temperature change on the transistor control circuit.

To protect the rectifier which supplies current to the load, it is desirable to reduce the output voltage of the rectifier and, therefore, the load voltage, when the load current increases to a value above a normal operating range. For this purpose the saturable reactor of the first magnetic amplifier is provided with a fourth saturating winding and there is provided a transistor circuit responsive to load current for initiating the supply of current to the fourth saturating winding, the supply of current to the fourh saturating winding causing the currents supplied to the first and second saturating windings to be interrupted or reduced to a negligible amplitude.

The invention will now be described in greater detail with reference to the accompanying drawing in which.

Figure 1:
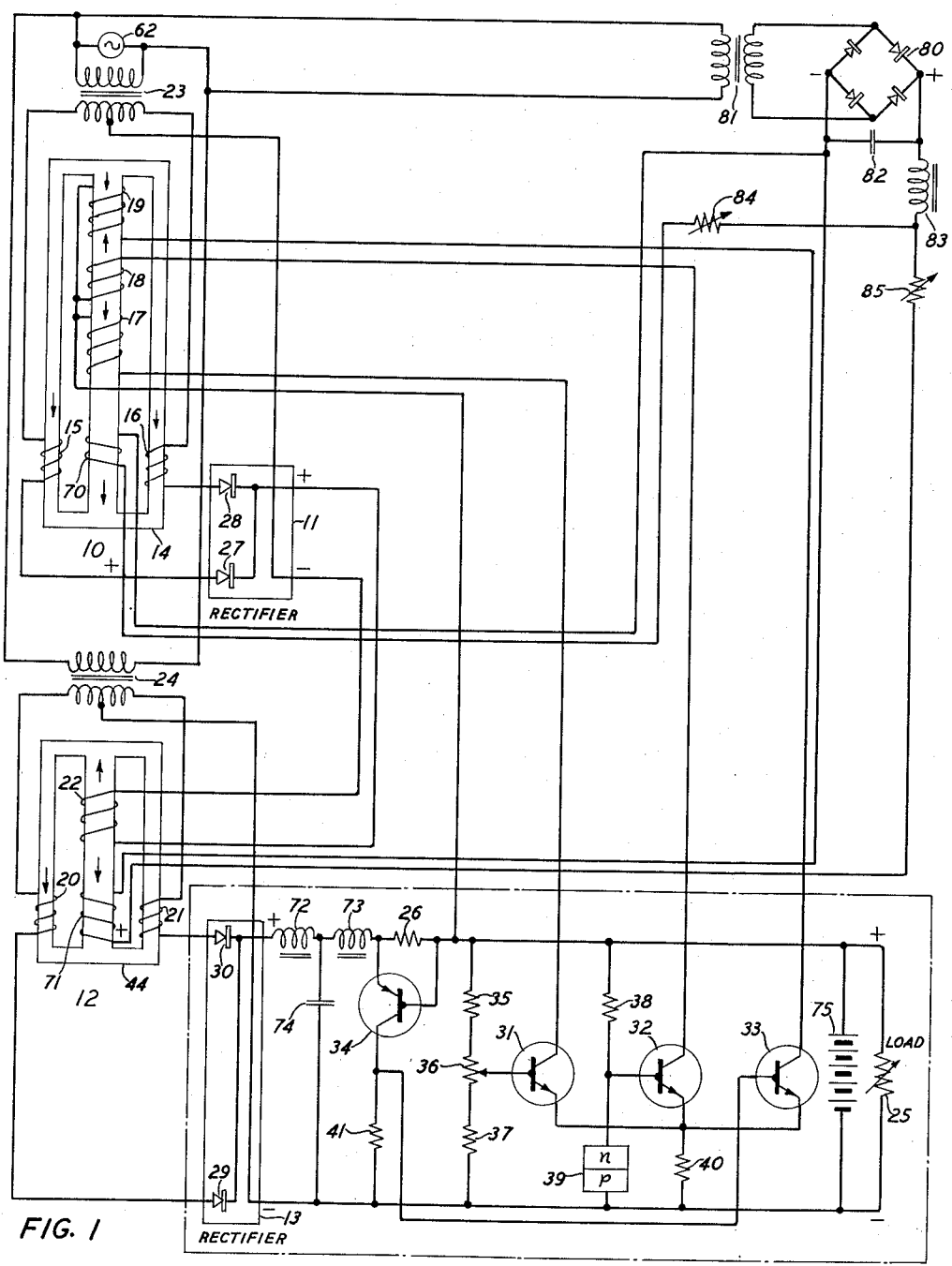
Fig. 1 is a schematic view of a regulated current supply apparatus embodying the invention.

Referring now to Fig. 1 of the drawing, there are provided a first magnetic amplifier comprising a saturable reactor 10 and a rectifier 11 and a second magnetic amplifier comprising a saturable reactor 12 and a rectifier 13. The reactor 10 comprises a three-legged core 14 of magnetic material having impedance windings 15 and 16 on the two outer legs, respectively, and having four saturating windings 17, 18, 19 and 70 on the middle leg for controlling the impedance of windings 15 and 16. The saturable reactor 12 comprises a three-legged core 44 of magnetic material having impedance windings 20 and 21 on the outer legs, respectively, and saturating windings 22 and 71 on the middle leg for controlling the impedance of windings 20 and 21. Current from an alternating-current supply source 62 is supplied through a transformer 23, through the windings 15 and 16 and through the rectifier 11 to the saturating winding 22 of reactor 12. Current from source 62 is supplied through a transformer 24, through the windings 20 and 21 and through the rectifier 13 to a load circuit comprising a load 25 which may vary and, in series therewith, a resistor 26. One end terminal of the secondary of transformer 23 is connected to a terminal of winding 15, the other terminal of which is connected through rectifying element 27 of rectifier 11 to the positive output terminal of rectifier 11. The other end terminal of the secondary of transformer 23 is connected through winding 16, the other terminal of which is connected through rectifying element 28 of rectifier 11 to the positive output terminal of rectifier 11. One end terminal of the secondary of transformer 24 is connected through winding 20 and a rectifying element 29 of rectifier 13 to the positive output terminal of rectifier 13. The other end terminal of the secondary of transformer 24 is connected through winding 21 and through a rectifying element 30 of rectifier 13 to the positive output terminal of rectifier 13. A mid-terminal of the secondary winding of transformer 24 is connected to the negative output terminal of rectifier 13. Windings 17, 18 and 19 have a common terminal which is connected to the positive terminal of the load 25. There is also provided, between the output of rectifier 13 and the load circuit, a ripple filter comprising the series choke coils 72 and 73 and a shunt condenser 74. A floating battery 75 is connected across the load 25.

Current from the supply source 62 is supplied to an auxiliary bridge rectifier 80 through a transformer 81 and a ripple filter comprising a shunt condenser 82 and a series choke coil 83 is provided for suppressing alternating components of the output current of the rectifier 80. Current from rectifier 80 is supplied through an adjustable resistor 84 to the biasing saturating winding 70 of the saturable reactor 10. Current from the rectifier is also supplied through an adjustable resistor 85 to the biasing saturating winding 71 of saturable reactor 12. As shown by the arrows in the drawing, the magnetomotive force due to current supplied to winding 70 opposes the magnetomotive forces due to the currents supplied to windings 15 and 16, respectively, and the magnetomotive force due to current supplied to biasing winding 71 opopses the magnetomotive forces due to currents supplied to windings 20 and 21, respectively.

There are provided three transistors 31, 32 and 33 of the n-p-n type and one transistor 34 of the n-p-n type, each transistor having a collector, an emitter and a base. There are connected across the load a first current path comprising in series a resistor 35, a potentiometer 36 and a resistor 37, and a second current path comprising in series a resistor 38 and a Zener diode 39. A Zener diode is a p-n junction rectifier poled so that current flows through it in the inverse or high resistance direction. The magnitude of the current is made sufficiently large to exceed the so-called Zener point so that the voltage drop across the diode will remain substantially constant irrespective of variations of the current flowing through it. Zener diodes and their characteristics are disclosed in an application of W. Shockley, Serial No. 211,212, filed February 16, 1951, now Patent No. 2,714,702, August 2, 1955.

The collectors of transistors 31, 32 and 33 are connected through saturating windings 17, 18 and 19, respectively, of saturable reactor 10 to the positive load terminal. The emitter of each of transistors 31, 32 and 33 is connected through a resistor 40 to the negative load terminal. The base of transistor 31 is connected to the variable tap of potentiometer 36. The base of transistor 32 is connected to the common terminal of resistor 38 and Zener diode 39. The emitter of transistor 34 is connected through the filter choke coils 72 and 73 to the positive output terminal of rectifier 13 and the base of transistor 34 is connected to the positive load terminal, so that the emitter-base path is across the resistor 26 in series with the load. The collector of transistor 34 is connected through a resistor 41 to the negative load terminal which is also the negative output terminal of rectifier 13. The common terminal of the collector of transistor 34 and of resistor 41 is conductively connected to the base of transistor 33. The unidirectional currents which are supplied to windings 15, 16, 17, 18 and 19 of reactor 10 flow through the windings in such directions that windings 15 and 18 produce aiding magnetomotive forces in one of the outer legs of the core and windings 16 and 18 produce aiding magnetomotive forces in the other outer leg of the core. The magnetomotive forces produced by the currents in windings 17, 19 and 70 are opposed to the magnetomotive force produced by winding 18. The magnetomotive force set up by current supplied to winding 22 of reactor 12 aids the magnetomotive forces produced by currents supplied to windings 20 and 21 in the outer legs respectively of the core of reactor 12, the magnetomotive force due to current supplied to winding 71 opposing the magnetomotive forces due to currents supplied to windings 20, 21 and 22.

When the current being supplied to the load 25 is within a normal operating range, an increase of load voltage, for example, will make the base of transistor 31 relatively more positive with respect to the potential of its emitter. As a result, the current flowing from the positive load terminal, through the saturating winding 17, into the collector of transistor 31, out of the emitter of transistor 31 and through the resistor 40 to the negative load terminal will increase to increase the voltage drop across resistor 40. The base of transistor 32 will thus become relatively more negative with respect to the potential of its emitter to cause a decrease of current flowing from the positive load terminal, through saturating winding 18, into the collector and out of the emitter of transistor 32 and through resistor 40 to the negative load terminal. The circuit components are chosen so that the increase of the current through winding 17 and the collector-emitter path of transistor 31 is substantially equal to the decrease of the current flowing through winding 18 and the collector-emitter path of transistor 32. These current changes, therefore, do not cause an appreciable change of voltage across resistor 40. The turns of windings 17 and 18 are substantially equal. The increase of magnetomotive force produced by the current increase of winding 17 and the substantially equal decrease of magnetomotive force produced by the decrease of current in winding 18 cause the resultant of these two magnetomotive forces to increase by an amount larger than the increase of magnetomotive force due to winding 17 alone. The direction of this resultant magnetomotive force is opposed to the direction of the magnetomotive force produced in the outer legs of the core by the currents through windings 15 and 16, respectively. The impedance of windings 15 and 16 is thus increased and the current supplied from source 62 through windings 15 and 16 and through the rectifying elements 27 and 28 to saturating winding 22 of reactor 12 is therefore reduced. The directions of the magnetomotive forces produced by currents supplied to the windings on the cores 14 and 44 are indicated by the arrows. The reduction of current supplied to winding 22 of reactor 12 reduces the magnetomotive force set up by this winding, which magnetomotive force is in an aiding direction with respect to the magnetomotive force set up in the outer legs of core 44 by the currents supplied through the windings 20 and 21. The impedance of windings 20 and 21 is thus increased causing a reduction of current supplied through windings 20 and 21 and through rectifying elements 29 and 30 to the load circuit comprising resistor 26 and the load 25 in parallel with the battery 75. The initially assumed rise of load voltage is thus minimized.

If the current supplied to winding 17 is $I_1$ and the current supplied to winding 18 is $I_2$, then the effective input current to the first magnetic amplifier is $I_1-I_2$. To place the magnetic amplifier in the middle of its operating range, the potentiometer 36 may be adjusted to make $I_1$ approximately equal to $I_2$ so that $I_1-I_2$ and the resultant magnetomotive force due to windings 17 and 18 are each approximately zero. Then if there is a rise of load voltage, $I_1-I_2$ increases in the positive direction and the resultant magnetomotive forces due to windings 17 and 18 oppose the magnetomotive forces due to windings 15 and 16. However, if the load voltage decreases so that $I_1-I_2$ has a negative value, the resultant magnetomotive force due to windings 17 and 18 is in aiding relationship with respect to the magnetomotive force due to windings 15 and 16. Therefore, when the load voltage decreases, the impedance of windings 15 and 16 is decreased to increase the current supplied to saturating winding 22 of reactor 12 and to thereby decrease the impedance of windings 20 and 21. The current supplied to the load circuit is thus increased to minimize the assumed reduction of load voltage. In a typical embodiment of the invention, the first stage magnetic amplifier may convert a signal of one milliampere from the transistor amplifier 31, 32 into a 100-milliampere signal supplied to the winding 22 of the final magnetic amplifier and the final magnetic amplifier may supply a maximum current of 200 amperes at 48 volts to the load 25.

Figure 3:
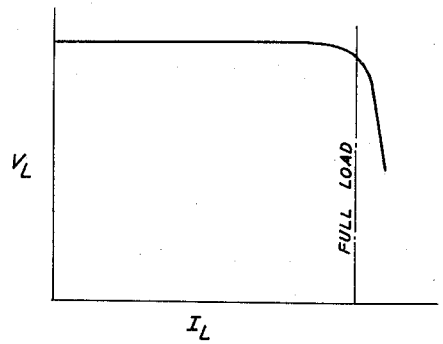
Fig. 3 is a diagram to which reference will be made in describing the invention.

Fig. 3 is a graph showing the relationship between load current $I_L$ and load voltage $V_L$. It shows the load voltage as being maintained substantially constant over a range of load current from zero to a certain value of load current designated "full load." The graph shows that, for values of load current larger than full load, the load voltage decreases rapidly, thus limiting the rise of load current. For the purpose of limiting the load current in this manner, there are provided the additional saturating winding 19 on the middle leg of core 14 and the control circuit comprising transistors 33 and 34. An increase of load current increases the voltage drop across resistor 26 which is impressed between the emitter and base of transistor 34 to increase the collector current of transistor 34 flowing through resistor 41. The base of transistor 33 is thus made relatively less negative with respect to its emitter. Over a load current range below full load, the voltage across resistor 41 will be less than the voltage across the resistor 40 and the base of transistor 33 will be sufficiently negative with respect to its emitter to substantially prevent current conduction in the circuit comprising winding 19 and the collector-emitter path of transistor 33. At full load current, the voltage across resistor 41 is approximately equal to the voltage across resistor 40. In response to a slight further increase of load current, the voltage across resistor 41 becomes sufficiently larger than the voltage across resistor 40 to cause transistor 33 to become conductive so that current will flow through winding 19, the collector-emitter path of transistor 33 and through resistor 40. The resulting increased current through resistor 40 will increase the voltage drop thereacross sufficiently to interrupt the current conduction through reactor windings 17 and 18 and the collector-emitter paths of transistors 31 and 32. The current flowing through winding 19 is in a direction to set up a magnetomotive force which opposes the magnetomotive forces set up by windings 15 and 16, respectively, in the outer legs of the core 14. Therefore, as the current supplied to the load increases above the maximum current of the normal load range, the current through winding 19 increases to increase the magnetomotive force due to winding 19. The impedance of windings 15 and 16 is thus increased and the voltage drop across these windings is increased to cause a reduction of the voltage impressed upon the load circuit and of the voltage across the load. Thus, when full load current is reached, the output voltage of the rectifier 13 decreases in response to additional load to obtain the drooping characteristic curve shown in Fig. 3.

Figure 2:
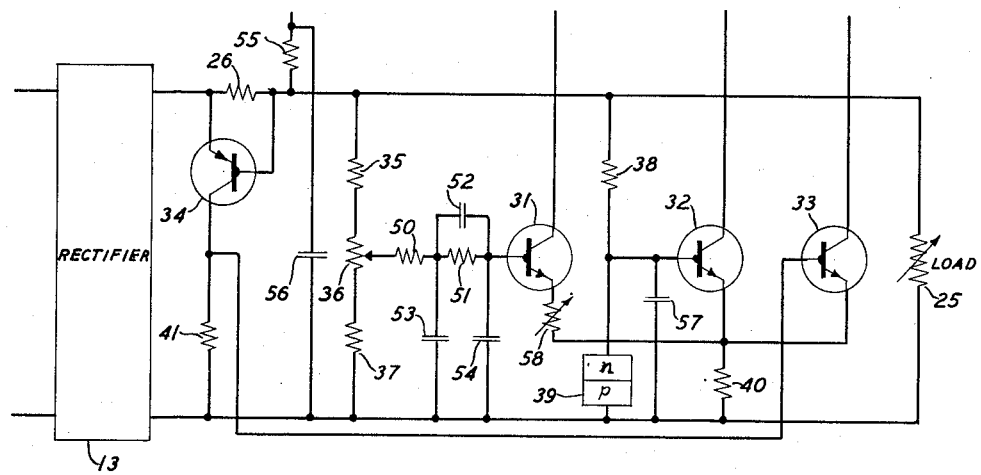
Fig. 2 is a schematic view of a modification of a portion of Fig. 1.

Fig. 2 is a modification of the portion of Fig. 1 shown within the dash-dot enclosure, the parts of Fig. 3 corresponding to the components of Fig. 1 being identified by the same numerals. In Fig. 3, the resistors 50 and 51 and condensers 52, 53 and 54 comprise a network which stabilizes the feed-back loop through the transistor amplifier and the magnetic amplifiers by controlling the loop gain and phase as functions of frequency. The resistor 55 and condensers 56 and 57 are provided to decouple for alternating current signals, the power supply for the collectors of transistors 31 and 32 and the power supply for the Zener diode 39, the positive load terminal being connected through resistor 55 to the common terminal of windings 17, 18 and 19. The adjustable resistor 58 provides gain control for the amplifier comprising transistors 31 and 32 over a considerable range.

What is claimed is:

1. In combination, a saturable reactor having an impedance winding and a first and a second control winding to which currents may be supplied for controlling the impedance of said impedance winding, a direct-current source having a positive and a negative terminal, two transistors each having a collector, an emitter and a base, means comprising said control windings connecting said collectors respectively to one of said terminals, a resistor, means comprising said resistor connecting said emitters to the other of said terminals, means for maintaining the base of one of said transistors at a substantially fixed potential with respect to said other of said terminals, and means for impressing upon the base of the other of said transistors with respect to said other of said terminals a potential which may vary for controlling the currents flowing through said control windings.

2. The combination with a source of direct-current having a postive and a negative terminal, a saturable reactor comprising a core of magnetic material, an impedance winding on said core and a first and a second control winding on said core for controlling the impedance of said impedance winding in response to currents supplied to said control windings, two transistors of the same type each having a collector, an emitter and a base, a resistor, and means for supplying to said control windings from said source currents for setting up opposed magnetomotive forces in said core, said means comprising means including one of said control windings connecting the collector of one of said transistors to one of said terminals, means including the other of said control windings connecting the collector of the other of said transistors to said one terminal, means including said resistor connecting said emitters to the other of said terminals, means for maintaining the base of one of said transistors at a substantially fixed potential with respect to the potential of said other of said terminals, and means for impressing upon the base of the other of said transistors, a potential which may vary with respect to the potential of said other of said terminals for controlling the currents in said control windings.

3. In combination, a current supply source having positive and negative terminals, two transistors each having a collector, an emitter and a base, a first and a second resistor, means for connecting the emitter of one of said transistors to one of said terminals, means comprising said first resistor connecting the collector of said one transistor to the terminal other than the one to which the emitter of said one transistor is connected, means for connecting the collector of the other of said transistors to one of said terminals, means comprising said second resistor for connecting the emitter of said other transistor to the terminal other than the one to which the collector of said other transistor is connected, means for conductively connecting the collector of said one transistor to the base of said other transistor, and means for impressing upon the base with respect to the emitter of said one transistor a potential for controlling the collector current of said other transistor.

4. In combination, a source of direct voltage having positive and negative terminals, an electromagnetic device having a winding, a first and a second resistor, a first transistor of the p-n-p type, a second transistor of the n-p-n type, means for connecting the emitter of said first transistor to said positive terminal, means comprising said first resistor for connecting the collector of said first transistor to said negative terminal, means comprising said winding for connecting the collector of said second transistor to said positive terminal, means comprising said second resistor for connecting the emitter of said second transistor to said negative terminal, means for conductively connecting the collector of said first transistor to the base of said second transistor, and means for impressing upon the base with respect to the emitter of said first transistor a potential for controlling the current through said winding.

5. In combination, two transistors of the same type each having a collector, an emitter and a base, a direct-current source having a positive and a negative terminal, means for connecting said collectors to one of said terminals, a resistor, means comprising said resistor for connecting said emitters to the other of said terminals, a first circuit comprising said resistor connecting the base and the emitter of one of said transistors, current normally flowing through the collector-emitter path of said one transistor, a second circuit comprising said resistor connecting the base and the emitter of the other of said transistors, and means for impressing upon the base with respect to the emitter of said other transistor a potential for increasing the current in the collector-emitter path of said other transistor to a magnitude sufficient to cause interruption of the current in the collector-emitter path of said one transistor.

6. In combination, means for supplying current from a direct-current source to a load circuit including a load, a resistor, a first and a second transistor each having a collector, an emitter and a base, means for supplying current from said source through said resistor and the collector-emitter path of said first transistor in series, control means responsive to current supplied thereto for controlling in part at least the voltage of said source, means for supplying current from said source through said control means and the collector-emitter path of said second transistor in series, a circuit comprising said resistor connecting the emitter and base of said second transistor, and means responsive to the amplitude of the current supplied to said load circuit for controlling the base-emitter potential of said first transistor, thereby controlling the current supplied to said control means.

7. In combination, means for supplying current from a direct-current source to a load circuit including a load, a first and a second transistor each having a collector, an emitter and a base, means for supplying current from said source to the collector-emitter path of each of said transistors, means responsive to the collector currents of said transistors for controlling the voltage of said source, means responsive to load voltage and effective when the load current is less than a predetermined value for controlling the base-emitter potential of said first transistor, thereby controlling the collector current of said first transistor to minimize load voltage changes, means responsive to current conduction through the collector-emitter path of said first transistor when the load current is less than said predetermined value for biasing the base with respect to the emitter of said second transistor to substantially prevent current conduction through the collector-emitter path of said second transistor, means responsive to load current effective when the load current has a value sufficiently greater than said predetermined value for impressing upon a circuit connecting the base and emitter of said second transistor a voltage for initiating current conduction through the collector-emitter path of said second transistor, thereby decreasing the load voltage as the load current is increased, and means responsive to said current conduction in said second transistor for interrupting the current conduction through the collector-emitter path of said first transistor.

8. In combination, means for supplying current from a direct-current source to a load circuit including a load, said load circuit having one current path connecting one terminal of said source to one terminal of said load and another current path connecting the other terminal of said source to the other terminal of said load, electromagnetic means for controlling the voltage of said source comprising a first, a second and a third winding, a first, a second and a third transistor each having a collector, an emitter and a base, means comprising said first, second and third windings for connecting the collectors of said first, second and third transistors respectively to one of of said current paths, a first resistor having a terminal connected to the other of said current paths, means comprising said first resistor connecting the emitters of said first, second and third transistors to the other of said current paths, means for maintaining the base of said second transistor at a substantially constant potential with respect to the potential of said terminal of said resistor, means for impressing upon the base of said first transistor a potential intermediate the potentials of said current paths, a fourth transistor having a collector, an emitter and a base, a second and a third resistor, means for connecting said second resistor in series in said one current path, means comprising said third resistor for connecting the collector of said fourth transistor to said other current path, means for connecting said emitter and said base of said fourth transistor across said third resistor, and means for conductively connecting the collector of said fourth transistor to the base of said third transistor.

9. A combination in accordance with claim 8 in which said electromagnetic means is a saturable reactor having an impedance winding the impedance of which is controlled in response to currents flowing in said first, second and third windings and in which said direct-current source comprises a rectifier and means for supplying current through said impedance winding to said rectifier from an alternating-current supply source.

10. In combination, a source of rectified current having a positive and a negative terminal, electromagnetic means having a first and a second winding for controlling the voltage between said terminals, a first and a second transistor each having a collector, an emitter and a base, a first resistor, means for connecting the collector of said first transistor through said first winding and said first resistor in series to one of said source terminals, means for connecting the collector of said second transistor through said second winding and said first resistor in series to said one source terminal, a first condenser in a current path connecting a common terminal of said first resistor and said first and second windings to the other terminal of said source, a second resistor, a constant voltage device, a first current path comprising said second resistor and said constant voltage device in series connected between said source terminals, a terminal of said resistor being connected to said one source terminal, a second condenser connected across said constant voltage device, a third resistor, means for connecting the emitter of said second transistor through said third resistor to said other source terminal, a fourth resistor which may be varied, means comprising said fourth resistor and said third resistor in series for connecting the emitter of said first transistor to said other source terminal, a resistance path having two end terminals connected respectively to said source terminals and having a third terminal intermediate said end terminals, a fifth and a sixth resistor, means comprising said fifth and sixth resistors in series connecting said third terminal to the base of said first transistor, a third condenser connected across said sixth resistor, a fourth condenser connecting a common terminal of said fifth and sixth resistors to said other source terminal, and a fifth condenser connecting a common terminal of said sixth resistor and said base to said other source terminal.

11. In combination, a direct-current source, a saturable electromagnetic device having an impedance winding, two saturating windings for controlling the impedance of said impedance winding and a core of magnetic material for said windings, means comprising said impedance winding for controlling the voltage of said current source, means for supplying current from said source to each of said saturating windings, said saturating windings being wound to set up opposed magnetowave forces in said core, and means for simultaneously increasing the current in one saturating winding and decreasing the current in the other saturating winding and vice versa, whereby a larger impedance change is produced in said impedance winding than would be produced by the current change in one only of said saturating windings.

12. In combination, a direct-current supply source, a saturable electromagnetic device comprising a core of magnetic material, an impedance winding on said core and a first and a second saturating winding on said core for controlling the impedance of said impedance winding, means for supplying from said source to said saturating windings currents for setting up opposed magnetomotive forces in said core, means for changing the current in said first saturating winding, and current responsive means responsive to an increase of the current supplied to said first saturating winding for decreasing the current supplied to said second saturating winding and vice versa, whereby the change of the resultant of said opposed magnetomotive forces is greater than the change of either one of said magnetomotive forces.

13. In combination, an electromagnetic device comprising a core of magnetic material and a plurality of windings on said core, an amplifier having two stages, a direct-current source, means for supplying a first current from said source through a first of said amplifier stages to a first of said windings to set up a first magnetomotive force in said core, means for supplying a second current from said source through the second of said amplifier stages to a second of said windings to set up a second magnetomotive force in said core opposed to said first magnetomotive force, means for impressing a control voltage on said first amplifier stage for controlling said first current and coupling means for said stages responsive to an increase of said first current for decreasing said second current and vice versa.

14. In combination, an electromagnetic device comprising a core of magnetic material having a plurality of windings thereon including an impedance winding and a first, a second and a third saturating winding for controlling the impedance of said impedance winding, means for supplying current from a direct-current source to a load, means comprising said impedance winding for controlling the voltage of said source, means for supplying current from said source to said first and second saturating windings to set up in said core a first and a second magnetomotive force which are opposed, means responsive to a change of load voltage for changing simultaneously the current supplied to said first saturating winding in one sense and the current supplied to the second saturating winding in the opposite sense, and means under control of the currents supplied to said first and second saturating windings and to said load for controlling the supply of current from said source to said third saturating winding.

15. In combination, a direct-current source, a saturable electromagnetic device having an impedance winding, a first and a second saturating winding for controlling the impedance of said impedance winding and a core of magnetic material for said windings, means comprising said impedance winding for controlling the voltage of said current source, and means for supplying current from said source to said saturating windings comprising a first control means for increasing the current supplied to said first saturating winding in response to an increase of the voltage of said source and vice versa and a second control means for substantially simultaneously decreasing the current supplied to said second saturating winding in response to an increase of current supplied to said first saturating winding and vice versa, said saturating windings being wound on said core to set up therein opposing magnetomotive forces.

References Cited in the file of this patent
UNITED STATES PATENTS

| | | |
|---|---|---|
| 2,259,647 | Logan | Oct. 21, 1941 |
| 2,373,383 | Christopher | Apr. 10, 1945 |
| 2,554,203 | Morgan | May 22, 1951 |
| 2,578,405 | Downie | Dec. 11, 1951 |
| 2,617,973 | Wolff et al. | Nov. 11, 1952 |